United States Patent [19]
Couture et al.

[11] Patent Number: 6,119,947
[45] Date of Patent: Sep. 19, 2000

[54] TEMPERED WATER MIXING SYSTEM

[75] Inventors: John R. Couture, Somerset; Colin J. MacDonald, Jr., North Easton, both of Mass.

[73] Assignee: Symmons industries, Inc., Braintree, Mass.

[21] Appl. No.: 09/227,077

[22] Filed: Jan. 5, 1999

[51] Int. Cl.$^7$ ................................................. G05D 23/13
[52] U.S. Cl. ................................. 236/12.11; 236/12.13
[58] Field of Search .................... 236/12.1, 12.11, 236/12.12, 12.13

[56] References Cited

U.S. PATENT DOCUMENTS

| | | | |
|---|---|---|---|
| 2,453,409 | 11/1948 | Chace | 236/12.13 |
| 2,506,700 | 5/1950 | Chace . | |
| 2,528,422 | 10/1950 | Chace . | |
| 2,535,893 | 12/1950 | Branson . | |
| 4,210,284 | 7/1980 | Tarnay et al. | 239/75 |
| 4,313,350 | 2/1982 | Keller, III et al. | 74/526 |
| 4,653,524 | 3/1987 | Wilson | 137/110 |
| 4,685,156 | 8/1987 | Brabazon | 4/194 |
| 4,774,978 | 10/1988 | Lepine, Jr. et al. | 137/334 |
| 4,854,499 | 8/1989 | Neuman | 236/93 B |
| 4,909,435 | 3/1990 | Kidouchi et al. | 236/12.12 |
| 4,923,115 | 5/1990 | Sekoguchi et al. | 236/12.11 |
| 5,011,074 | 4/1991 | Kline | 236/12.13 |
| 5,024,378 | 6/1991 | Bergmann et al. | 236/93 B |
| 5,100,261 | 3/1992 | Plemon | 405/186 |
| 5,125,433 | 6/1992 | DeMoss et al. | 137/607 |
| 5,135,028 | 8/1992 | Rickenbach et al. | 137/599 |
| 5,184,642 | 2/1993 | Powell | 137/607 |
| 5,203,496 | 4/1993 | Kline | 236/12.2 |
| 5,323,960 | 6/1994 | Kline | 236/12.2 |
| 5,348,223 | 9/1994 | Sonesson et al. | 236/12.12 |
| 5,350,112 | 9/1994 | Stein | 236/12.13 |
| 5,379,936 | 1/1995 | Kline | 236/12.2 |
| 5,647,531 | 7/1997 | Kline et al. | 236/12.14 |

FOREIGN PATENT DOCUMENTS

| | | |
|---|---|---|
| 0 302 770 B1 | 10/1992 | European Pat. Off. . |
| 2 303 685 | 2/1997 | United Kingdom . |

OTHER PUBLICATIONS

Amot Controls, *Model 2470*, 1997, pp. A–49–52.
Leonard Water Temperature Controls, *Cabinet Assembly For Drench Or Combination Emergency Shower*, TM–800–STSTL–REC, Sep. 1998.
Leonard Water Temperature Controls, *Cabinet Assembly For Drench Or Combination Emergency Shower*, TM–5125–STSTL–REC, Sep. 1998.
Leonard Water Temperature Controls, *Exposed Assembly For Drench Or Combination Emergency Shower*, TM–800, Sep. 1998.
Leonard Water Temperature Controls, *Exposed Assembly For Drench Or Combination Emergency Shower*, TM–850, Sep. 1998.

Primary Examiner—William E. Tapolcai
Attorney, Agent, or Firm—Pandiscio & Pandiscio

[57] ABSTRACT

An improved tempered water mixing system comprises a thermostatically operated main mixing valve for blending cold and hot water supplies during normal system operation, a secondary temperature-limiting flow-control device in the form of a thermostatic valve (also known as a pressure-regulator), with the thermostatic valve and the pressure regulating valve being connected to function as fail-safe devices so as to provide an uninterrupted discharge outflow at a substantial flow rate in the event of a malfunction of the main mixing valve.

6 Claims, 1 Drawing Sheet

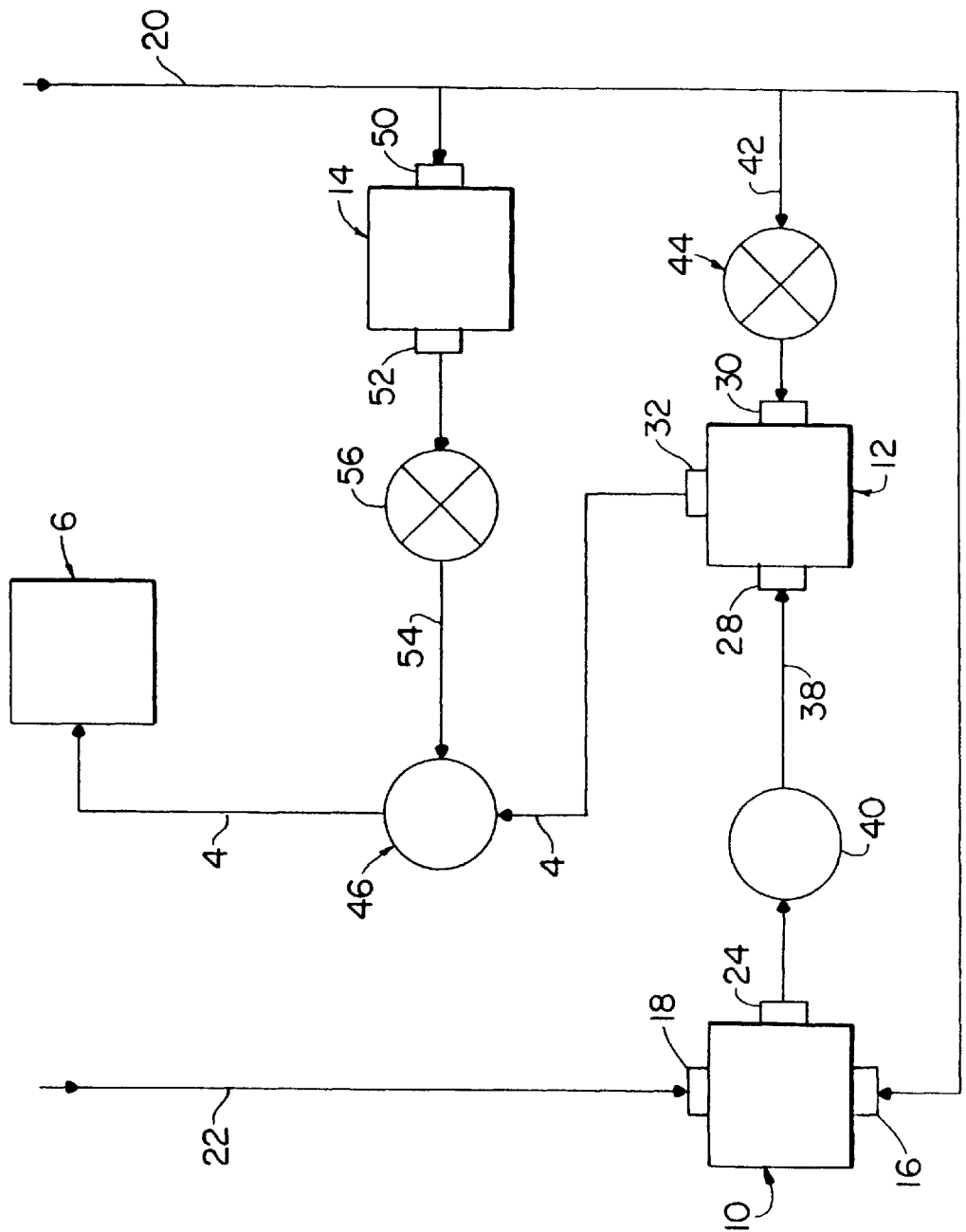

TEMPERED WATER MIXING SYSTEM

BACKGROUND OF THE INVENTION

This invention relates generally to emergency drench shower and eyewash stations of the type wherein cold and hot water supplies are thermostatically blended to provide a tempered discharge outflow at a selected temperature. More particularly, this invention relates to an improved tempered water mixing system having control means for assuring substantial water discharge, without risk of scalding the user, in the event of a main thermostatic mixing valve malfunction.

Tempered water mixing systems are used in a variety of commercial and/or industrial applications, e.g., in emergency drench shower stations and/or safety eyewash stations used to rinse hazardous chemicals from a person's skin and clothing or to extinguish burning clothing on a person. A typical system includes a thermostatic mixing valve adapted to thermostatically and automatically blend in-flowing hot and cold water streams to produce a mixed, tempered water output stream having a selected temperature, e.g., 80° F.

A known problem with such tempered water mixing systems is that their thermostatic mixing valves may malfunction. As noted in U.S. Pat. No. 5,350,112, issued Sep. 27, 1994 to M. I. Stein, the malfunction can occur in any one of several modes. In one mode, the main thermostatic mixing valve is stuck or fails in a state or position that allows unregulated full flow of hot water, resulting in potentially dangerous scalding of a person using an emergency shower or eyewash station. In another mode, the mixing valve is stuck or fails in a state or position such that it allows unregulated full flow of cold water, whereby a person using an emergency shower or eyewash station may be subjected to undesirably cold water flow. This particular malfunction mode tends to result in a shortened flush or rinse time which is not desired since it can contribute to hypothermia in installations located in a cold weather climate. A third failure mode is one which results in insufficient flow of hot or cold water, whereby the rate of flow of the discharged water stream is inadequate for proper rinsing of contaminants from a person or extinguishing a person's burning clothing.

As noted in said U.S. Pat. No. 5,350,112, some tempered water mixing systems have been designed with back-up features intended to address the failure modes noted above. Those systems that use solenoid operated valves in combination with various temperature switches and/or flow rate switches for bypassing cold water flow past the main mixing valve when a malfunction occurs suffer from the limitation that they rely upon electrical power to achieve proper back-up operation. Hence such back-up devices tend to malfunction in the event of an electrical power failure. Further, electrically powered back-up devices may be unacceptable for use in proximity with volatile materials.

U.S. Pat. No. 5,350,112 discloses and claims an improved tempered water mixing system with fail-safe features, the claimed system being characterized by providing in the hot water supply line a temperature limit control valve that is coupled to and responds to a temperature sensor that is coupled to the system's mixed (tempered) water discharge conduit. Notwithstanding the system provided by U.S. Pat. No. 5,350,112, there still exists a need for further improvements in tempered water mixing systems for emergency drench shower and eyewash stations, particularly to satisfy the requirements of ANSI Standard 2358.1 which identifies the procedure for testing emergency shower and eye wash stations.

SUMMARY OF THE INVENTION

A primary object of the present invention is to provide a tempered water mixing system that improves upon the system disclosed by U.S. Pat. No. 5,350,112.

A secondary object is to provide a tempered water mixing system that does not rely upon electrical components for fail-safe operation.

A more specific object of the present invention is to provide an improved water mixing system for substantially fail-safe blending of cold and hot water supplies so as to provide a tempered, discharge outflow at a pre-selected temperature level.

Another specific object is to provide a fail-safe tempered water mixing system that is particularly adapted for use in emergency drench shower stations and/or eye/wash stations.

In accordance with a preferred form of the invention, the improved system comprises a thermostatically operated main mixing valve for blending cold and hot water supplies during normal system operation, a secondary temperature-limiting flow-control device in the form of a thermostatic valve, and a pressure-responsive flow control device in the form of a pressure regulating valve (also known as a pressure regulator), with the thermostatic valve and the pressure regulating valve being connected to function as fail-safe devices so as to provide an uninterrupted discharge outflow at a substantial flow rate in the event of a malfunction of the main mixing valve. More specifically, the main thermostatic mixing valve is coupled to a cold water supply and a hot water supply, and includes a thermostatic motor for blending the cold and hot water inflows in a manner so as to obtain a tempered water outflow stream at a pre-selected temperature level. Also the secondary thermostatic valve is plumbed in series with the main mixing valve so as to monitor the temperature of the water discharged by that main mixing valve. If the main mixing valve output exceeds a predetermined temperature, the secondary thermostatic valve will operate to permit a modulated flow of cold water to be added to the water in the discharge line of the main mixing valve, so as to maintain the system water discharge stream at a predetermined temperature limit. The pressure regulating valve is provided for the purpose of giving the system an alternative back-up mode, serving to cause delivery of cold water to the system's discharge line in the event of a failure to deliver hot water to the main mixing valve at a satisfactory flow level. Accordingly the pressure regulating valve is connected so as be responsive to the pressure differential between the cold water supply and the discharge outflow from the main mixing valve. When that pressure differential exceeds a preset limit, representative of improper system operation, the pressure regulating valve will open to permit modulated bypass flow of make-up cold water past the main mixing valve. The cold water bypass flow permitted by the pressure regulator assures a substantial, albeit relatively cold, water flow through the system. Other features and advantages of the present invention, will become more apparent from the following detailed description, taken in conjunction with the accompanying drawing which illustrates, by way of example, the principles of the invention.

BRIEF DESCRIPTION OF THE DRAWING

The accompanying drawing illustrates a preferred embodiment of the invention in schematic form.

DETAILED DESCRIPTION OF THE REFERRED EMBODIMENT

As shown in the exemplary drawing, a tempered water mixing system has a tempered water discharge line 4 for connection to an emergency drench shower and/or eyewash station 6, e.g., as shown schematically at 12 in said U.S. Pat. No. 5,350,112. In accordance with the invention, the mixing system essentially includes a main thermostatic mixing valve 10, a temperature-limiting flow control device 12 in the form of a thermostatic valve, and a pressure-responsive flow control device 14 in the form of a pressure regulating valve, with the thermostatic valve 12 and the pressure regulator 14 providing a fail-safe back-up system that regulates operation of the tempered water mixing system in the event of a malfunction involving the main thermostatic mixing valve 10 or a failure in the supply of hot water.

The main thermostatic mixing valve 10 is of a type conventionally used in tempered water mixing systems. It includes a cold water inlet port 16 and a hot water inlet port 18 which are adapted for connection with cold and hot water supply lines in the form of conduits 20 and 22 respectively, a mixed water discharge outlet port 24, and a thermally operated valve cartridge (not shown), often identified as an internal thermostatic motor, which automatically blends the cold and hot water inflows from supply lines 20 and 22 in selected proportion, whereby a mixed water stream is discharged from outlet port 24. Conduits 20 and 22 are connected to cold and hot water supplies (not shown) respectively. By way of example, the hot water supply may be a hot water tank.

The secondary thermostatic valve 12 has first and second inlet ports 28 and 30, an outlet port 32, and an internal thermally movable valve member (not shown). Outlet port 24 of the main mixing valve 10 is connected to inlet port 28 of flow control device 22 via a conduit 38. Preferably, but not necessarily, a temperature gauge 40 is connected in line 38 to enable a user to readily determine visually the temperature of the water stream discharged by the main mixing valve. The second inlet port 30 of thermostatic valve 12 is connected to cold water supply line 20 via a conduit 42. Preferably, but not necessarily, a manually operable shut-off valve 44 is connected in line 42. The outlet or discharge port 32 of valve 12 is connected to system water discharge line 4. Preferably, but not necessarily, a second temperature gauge 46 is connected in line 4 to monitor the temperature of the water discharged from the system.

The pressure responsive flow control device 14 has a first high pressure port 50 connected to the cold water supply line 20 and a second low pressure port 52 that is connected to the system water discharge line 4 via a line conduit 54 as shown. Preferably, but not necessarily, a manually operable shutoff valve 56 is connected in line 54.

A variety of commercially available thermostatic mixing valves can be used as the main mixing valve 10. Preferably the thermostatic mixing valve is of the type that has an external manual adjustment means, e.g., a rotatable control knob, for adjusting the temperature setting of its thermostatic motor. The thermostatic motor may, but need not, be of the type that uses wax or some other material having a high thermal coefficient of expansion to modify operation of the valve in response to changes in temperature. Thermostatic mixing valves using such thermostats are exemplified by U.S. Pat. Nos. 4,475,684 and 2,855,151. One line of suitable thermostatic mixing valves that may be used as the main mixing valve are the TEMPCONTROL® thermostatic water controllers that are sold by Symmons Industries, Inc. Of Braintree, Mass. The TEMPCONTROL thermostatic controllers are available in several different flow capacities. They are manually adjustable for accurate setting of desired mixed water temperature and are characterized by thermal motors that are capable of controlling water temperature within ±3° F. at 45 psi differential. Other suitable thermostatic mixing valves are available from other commercial sources, e.g., Powers Process Controls of Skokie, Ill., which sells suitable mixing valves under the designation Hydroguard Series 430. For emergency drench shower applications and the like, it is common and preferred to adjust the main mixing valve so as to provide a discharge stream (in line 38) with an outflow temperature of about 80 degrees Fahrenheit.

The thermostatic valve 12 functions as a high temperature limiter. It is of the type that is factory-set, i.e., is set by the manufacturer, at a nominal temperature. It is preferred that the high temperature limit valve 12 be non-adjustable to prevent tampering. Suitable thermostatic valves for use as a high temperature limiting flow device are exemplified by the ones that are sold by Amot Controls of Richmond, Calif. under the designation Amot Model R. The thermostatic valve senses the water temperature at outlet port 32 and it keeps the valve open to inlet port 28 and closed to inlet port 30 until the water temperature reaches a selected level below the nominal temperature, preferably only several F. degrees below the nominal setting. As the temperature of the water at outlet port 32 continues to rise, the internal valve member in thermostatic valve 12 commences to close off inlet port 28 and to open the valve to inlet port 30, thereby initiating inflow of cold water into system discharge line 4. Preferably also the thermostatic valve 12 is constructed and pre-set so that it will be fully closed to inlet port 28 and fully open to inlet port 30 when the water temperature at inlet port 28 reaches a predetermined level above the nominal temperature setting of valve 12, preferably only several degrees F. degrees above the nominal setting. The valve 12 continually modulates the fluid flow via inlet ports 28 and 30 so as to maintain the temperature of the water in discharge line 4 at or below its nominal temperature. Preferably, for emergency drench shower applications and the like, the thermostatic mixing valve 12 is set at a nominal temperature of about 95° F., with the valve being adapted to (1) start closing off inlet port 28 and opening inlet port 30 when the water temperature at outlet port 32 reaches a temperature of about 92° F. or 93° F., and (2) close off inlet port 28 completely and allow maximum inflow of cold water via inlet port 30 when the mixed water passing from outlet port 32 into system discharge line 4 reaches a temperature of about 97° F. or 98° F.

The pressure regulating valve 14 may take various forms, but essentially it comprises a high pressure port 50, a low pressure port 52, an internal spring-biased valve member (not shown), and a pressure-responsive motor (also not shown) for moving that valve member in response to the pressure differential across ports 50 and 52. The valve member is spring-biased in a direction to keep the valve closed so long as the pressure differential across ports 50 and 52 is below a predetermined limit. If the pressure differential increases above that predetermined liming, the internal valve member will move against the spring bias to open the valve to permit cold water to flow into discharge line 4, with the rate of cold water inflow varying in accordance with the position of the valve member which will vary in response to and as a function of the magnitude of the increase in pressure differential above the predetermined limit.

Any of a variety of commercially available pressure regulators may be used as regulator 24. Preferably, the regulator is of the type that has a manually adjustable control means for adjusting the pressure differential at which responds, By way of example but not limitation, the model K-5 pressure regulator made and sold by A. W. Cash Valve Mfg. Corp. of Decatur, Ill. may be used in practicing this invention. Preferably, but not necessarily, the pressure regulator is set so that it will remain closed until the pressure differential across its two ports reaches a predetermined limit of about 5 pounds per square inch (5 psi). Consequently the pressure regulator will block inflow of water from cold water supply line 20 to discharge line 4 so as long as the pressure differential does not exceed 5 psi. However, if the pressure differential rises above that pressure, regulating valve 14 will open to allow cold water to pass from supply line 20 into system discharge line 4.

In accordance with the invention, the high temperature limit control valve 12 and the pressure responsive valve 14 function, in general terms, to prevent water discharged through the flow conduit 4 from exceeding a preset upper end temperature limit, thereby protecting against undesired scalding of a person using the emergency shower station 6. In addition, these control valves function to ensure that a minimum and substantial flow rate is provided through the flow conduit 4 in the event of that the flow of hot water to the main mixing valve is terminated or drops to a low flow rate, in which event the system causes flow rate to take priority over temperature to ensure the availability of flush water in an emergency situation.

A specific description of the fail-safe operation of the above-described embodiment of the invention is as follows. Assume that the cold and hot water supply lines are connected as shown so as to supply cold and hot water to the main mixing valve 10, with the hot water being supplied at a temperature of approximately 100° F., and the main mixing valve 10 being set to mix hot and cold water so as to provide a mixed water output stream having a temperature of approximately 80° F. Assume also that the backup thermostatic valve 12 is pre-set to a nominal temperature of 90° F., but will begin to close off inlet port 28 and open inlet port 30 when the water temperature at inlet port 28 reaches a temperature of about 87° F., and will fully close off inlet port 28 and fully open inlet port 30 when the water temperature at inlet port 28 reaches a temperature of 90° F. or higher. Assume also that the pressure regulator is set so that it is normally closed to its high pressure port 50 and will not open to that port until the pressure differential across its two ports reaches about 5 psi, and that under normal flow conditions the pressure differential between across the regulator is less than 5 psi. Accordingly, so long as hot water flows into the main mixing valve at a normal flow rate and pressure, tempered water at a temperature of approximately 80° F. will flow freely from the main mixing valve to the discharge line 4 via the backup thermostatic valve 12, and no cold water will flow through either the thermostatic valve 12 or the regulator 14 to the discharge line 4. If subsequently the temperature of the mixed water delivered by the main mixing valve and passing through outlet port 32 should increase to a level of about 87° F. the backup valve 12 will operate to reduce the flow of tempered water via inlet port 28 and initiate inflow of cold water via cold water line 20, thereby maintaining the temperature of the mixed water in discharge line 4 at an acceptable level. Essentially temperature limit control valve 12 responds so as to modulate or restrict hot water flow from main mixing valve 10 in a progressively decreasing manner, while modulating inflow of cold water via line 20 in a progressively increasing manner, for purposes of keeping the temperature of the water stream discharged by line 4 to the emergency station 6 at an acceptable level.

If a malfunction should take the form of a substantial drop in the pressure of the hot water supplied by supply line 22 to main valve 10, or a drop in the pressure of the tempered water delivered by the main valve to backup valve 12, (both indicative of a low flow condition), there will be a resultant pressure drop in the mixed water delivered to water discharge line 4. If the pressure drop in line 4 is such as to produce a pressure differential across pressure regulator 14 in excess of 5 psi, the pressure regulator valve 14 will then operate to introduce cold water from cold water supply line 20 into discharge line 4, thereby maintaining a minimum pressure differential between the cold water supply and the discharge conduit 4 and assuring that a person in the shower drench/eyewash station 6 will have available a substantial water flow sufficient to complete the required rinse, albeit a cold rinse.

It should be appreciated further in connection with the function of pressure regulator 14, a flow rate reduction in hot water supply line 22 can occur in a plumbing installation wherein multiple flow valves are opened at the same time. It is recognized also that modulation of the temperature limit control valve 12 may itself cause a significant reduction in the total water flow rate through the discharge flow conduit 4. Whatever the cause for a reduction in total water flow rate through conduit 4, the pressure responsive flow limit control valve 14 will respond to supplement the water flow passed by flow limit control valve 12. The water flow supplementation effected by operation of pressure regulator 14 is independent of the actual temperature of the water passed by main valve 10 or backup valve 12.

It should be noted that the water temperature along the system's discharge conduit 4 will not be reduced below the desired tempered level unless hot water flow is substantially or fully obstructed. However, in that event the fail-safe operational mode of pressure regulator valve 14 will still permit a substantial flow of cold water to the emergency station.

As a modification of this invention, it is contemplated that the backup thermostatic valve 12 may be replaced with a 3-port thermostatic valve that is constructed so that its thermostatic motor or thermally responsive valve member senses directly the temperature of the mixed water stream received from the main mixing valve, and responds to that sensed temperature to modulate its inflow of that mixed water stream and its inflow of cold water from the cold water supply as the sensed temperature rises above the nominal temperature, whereby to maintain the temperature of the water passed to the system's discharge line 4 at an acceptable level.

A primary advantage of the above-described system is that it is relatively simple to construct and can be made at a relatively modest cost since it can be implemented using conventional commercially available components. Another advantage is that it provides a reliable emergency system with adequate fail-safe backup features. A further advantage is that the main thermostatic mixing valve and the backup thermostatic valve 12 can be set at temperatures different from the exemplary temperatures mentioned hereinabove. Also the backup thermostatic valve may be constructed so as to have different response characteristics, e.g., it may be made so that it will begin to close off inlet port 28 more than 2–3 degrees below its nominal temperature setting and/or fully open port 30 only when the water temperature at inlet port 28 is at a substantially higher level than its nominal temperature setting. Accordingly, although the tempered water mixing system of the present invention is particularly designed for use in providing tempered or relatively tepid water outflow for use in emergency shower applications and the like, it can be used for other tempered water mixing system applications, such as various industrial process applications, etc. The mixing system of this invention is suitable for other applications because it is designed to provide a discharge water outflow at a selected and relatively lukewarm temperature level, without significant risk of a failure mode in which excessive quantities of hot water are inadvertently delivered. Moreover, the system is designed to establish a priority with respect to temperature and flow rate, in a manner insuring a minimum and substantial water flow rate at all times.

Still other advantages will be obvious to persons skilled in the art from the foregoing description and the accompanying drawing.

A variety of modifications and improvements to the invention will be apparent to those skilled in the art. Accordingly, no limitation on the invention is intended by way of the foregoing description and accompanying drawings, except as set forth in the appended claims.

What is claimed is:

1. A tempered water mixing system, comprising:

a system water discharge conduit;

a main mixing valve for connection to a cold water supply and a hot water supply, said main mixing valve including means for blending water from said cold and hot water supplies so as to cause said main mixing valve to discharge a tempered water stream having a selected temperature;

a thermostatic temperature limit control valve having means for connection to a cold water supply, said temperature limit control valve being connected to receive said tempered water stream from said main mixing valve and to pass said tempered water into said system water discharge conduit, said temperature limit control valve having means for modulating the addition of cold water to said tempered water stream when the temperature of said tempered water stream exceeds a preset limit; and a pressure-responsive flow control valve for introducing cold water to said system water discharge conduit when the fluid pressure of said tempered water stream falls below a predetermined level.

2. A tempered water mixing system according to claim 1 wherein said temperature limit control valve has means for reducing the rate at which it passes said tempered water stream when the temperature of said tempered water stream exceeds said preset limit.

3. A tempered water mixing system comprising:

a main mixing valve having a cold water inlet, a hot water inlet, a discharge outlet, and thermostatic blending means for blending cold and hot water inflows coupled respectively to said cold and hot water inlets to provide a tempered water discharge outflow at a selected temperature level at said discharge outlet;

a cold water supply conduit for supplying cold water to said cold water inlet;

a hot water supply conduit for supplying hot water to said hot water inlet;

a discharge flow conduit connected to said discharge outlet;

a high temperature limit valve connected between said discharge outlet of said main mixing valve and said discharge flow conduit, said high temperature limit valve including means responsive to the temperature of said tempered water discharge outflow for introducing and modulating a flow of cold water into said discharge flow conduit so as to prevent the temperature of said discharge outflow from exceeding a preset upper limit; and a flow control valve connected between said cold water supply conduit and said discharge flow conduit and including means responsive to the pressure differential between the fluid pressure in said cold water supply conduit and the fluid pressure in said discharge flow conduit to permit a bypass flow of cold water from said cold water supply conduit to said discharge flow conduit when said pressure differential exceeds a predetermined limit.

4. A tempered water mixing system according to claim 3 wherein said temperature limit control valve has means for reducing the rate at which it passes said tempered water stream to said discharge flow conduit when the temperature of said tempered water stream exceeds said preset limit.

5. A tempered water mixing system, comprising:

a main mixing valve having first and second inlet ports for connection to a cold water supply and a hot water supply respectively, an outlet port, and means for blending the cold and hot water supplies to provide a discharge outflow from said outlet port having a selected temperature level;

a temperature limit control valve having a first inlet port connected to said outlet port of said main mixing valve, a second inlet port connected to said cold water supply, an outlet port for discharging mixed water received from said main mixing valve, and means responsive to the temperature of said discharge outflow for causing said high limit temperature valve to modulate a cold water inflow to said second inlet port from said cold water supply when the temperature of said discharge outflow exceeds a preset limit;

a system water discharge conduit connected to said outlet port of said temperature limit control valve for delivering mixed water from said system to a selected site such as an emergency shower station; and a flow control valve responsive to the fluid pressure in said system water discharge conduit for bypassing a make-up flow of cold water past said main mixing valve to said system water discharge conduit when the fluid pressure of the hot water delivered to said second port of said main mixing valve or the fluid pressure of the discharge outflow from said main mixing valve falls below a predetermined limit.

6. A tempered water mixing system, comprising:

a main mixing valve having first and second inlet ports for connection to a cold water supply and a hot water supply respectively, an outlet port, and means for blending the cold and hot water supplies so as to provide a mixed water outflow from said outlet port having a selected temperature level;

a temperature limit control valve having a first inlet port connected to said outlet port of said main mixing valve so as to allow said mixed water out/flow to pass into said temperature limit control valve, a second inlet port connected to said cold water supply, an outlet port for discharging mixed water received from said main mixing valve, and means responsive to the temperature of said discharge outflow for (a) initiating and modulating a cold water inflow to said second inlet port from said cold water supply when the temperature of said mixed water outflow exceeds a preset limit, and (b) reducing the rate of flow of said mixed water outflow into said temperature limit control valve;

a system water discharge conduit connected to said outlet port of said temperature limit control valve for delivering water from said system to a selected site such as an emergency shower station; and a flow control valve responsive to the fluid pressure in said system water discharge conduit for bypassing a make-up flow of cold water past said main mixing valve to said system water discharge conduit when the fluid pressure of the hot water delivered to said second port of said main mixing valve or the fluid pressure of the mixed water outflow from said main mixing valve falls below a predetermined limit.

* * * * *